United States Patent [19]

Kurtz

[11] 3,769,052

[45] Oct. 30, 1973

[54] PLASTER COMPOSITION
[75] Inventor: Leonard D. Kurtz, Woodmere, N.Y.
[73] Assignee: Sutures, Inc., Coventry, Conn.
[22] Filed: May 17, 1971
[21] Appl. No.: 144,303

[52] U.S. Cl. .................................................. 106/111
[51] Int. Cl. ............................................ C04b 11/00
[58] Field of Search ..................... 106/109, 110, 111

[56] References Cited
UNITED STATES PATENTS
3,311,516  3/1967  Jaunarajs et al. ..................... 106/110

*Primary Examiner*—James E. Poer
*Attorney*—Larson, Taylor & Hinds

[57] ABSTRACT

Plaster of paris of high strength is obtained from a composition comprising plaster and synthetic resin fiber flock. Particularly strong products are obtained with flock of polyester fiber, for example polyethylene terephthalate fiber.

7 Claims, No Drawings

PLASTER COMPOSITION

BACKGROUND OF THE INVENTION

This invention relates to plaster of Paris compositions and to high strength plaster made therefrom. Various attempts have been made in the past to provide high strength gypsum products. For example, coarse glass fibers are disclosed as useful for this purpose in U.S. Pat. No. 3,062,670, issued Nov. 6, 1962, and fine textile glass fibers are disclosed in U.S. Pat. No. 2,681,863. Various other materials have been used to reinforce plaster such as wood fibers, asbestos, paper pulp and many other materials. While the materials used have produced set plaster of increased strength, it is desirable to find alternative reinforcing materials which are at least as effective in increasing strength. It is an object of the present invention to provide a plaster of paris composition including a reinforcing material which improves the strength of the set plaster. It is still a further object of the invention to provide a method of setting plaster of increased strength. It is still a further object to provide plaster of increased strength without increasing density of the set plaster.

BRIEF SUMMARY OF THE INVENTION

The foregoing and other objects which will be apparent to those having ordinary skill in the art are achieved according to the present invention by providing a plaster composition having improved set strength comprising plaster of paris and syntnetic resin fiber flock in an amount up to 40 parts by weight per 100 parts by weight of said plaster of Paris. A set plaster of increased strength is provided according to the invention by mixing the synthetic resin fiber flock with plaster of paris prior to setting of the plaster.

DETAILED DESCRIPTION

The invention will be illustrated more specifically by the following detailed description of the invention including examples of preferred embodiments.

The plaster of Paris to which the invention relates is conventional calcined gypsum $CaSO_4 \cdot \frac{1}{2} H_2O$ which sets on hydration to $CaSO_4 \cdot 2H_2O$. The composition may contain the usual retarders, accelerators, starches, core adhesives and the like as well as the weight reducing materials such as foam. The invention is applicable to the fabrication of gypsum products in general such as wallboard, orthopedic casts, and the like. A preferred embodiment is a plaster of Paris "bandage" such as that disclosed in U.S. Pat. No. 2,842,120.

The synthetic resin fiber flock which is useful in the invention is fine staple fiber flock having a length of preferably not more than ¼ inch, having a denier of up to about 20. The size of the flock can be quite small. Microfibers having a length of 0.06 inch or less may be successfully utilized. A suitable range is from 0.01 inch to ¼ inch, preferably 1/32 inch to 1/4 inch. The denier is preferably not more than about 10, and the preferred range is about 1 to 10. Synthetic resin fiber flock is widely available commercially in these sizes and is conventionally made by chopping continuous synthetic fibers. The prefereed fiber material is linear polyester resin from the reaction of an organic diol, such as ethylene glycol, and a dibasic acid, such as terephthalic acid and polyethylene terephthalate is a preferred polyester. Other synthetic resin fiber flock such as polyamide, rayon, and the like, may also be used.

The amount of the flock used can vary widely. However, in general, an amount of at least 3 percent by weight, based on the weight of the plaster of paris, is needed to obtain a significant increase in strength and, preferably, at least 5 percent by weight is used to obtain a substantially stronger set plaster. The maximum amount of fiber flock will generally be about 50 percent by weight based on the weight of the plaster of paris since substantially larger amounts will tend to weaken the product due to a diluting effect. It is preferred, however, to utilize at most about 30 percent by weight because, in general, strength is not substantially increased beyond that amount. It will therefore be seen that an amount of from 3 to 50 percent by weight based on the weight of the plaster of Paris is suitable while an amount of from 5 to 30 percent is preferred.

EXAMPLE 1

Plaster of Paris and water are blended by hand in the following proportions:

Plaster of Paris (Hydrocal, U.S. Gypsum) 100 parts by weight
Water 60 parts by weight The blended plaster is placed in a mold and allowed to set for a period of from 18 to 24 hours. The set plaster has the following characteristics:

density: 26.5 g/in$^3$; impact strength: 0.45 ft-lbs/in$^2$

EXAMPLE 2

Example 1 is followed except that the amount of water is 30 parts by weight per 100 parts of plaster. Density of the set plaster is 28.5 g/in$^3$ and strength is 0.80 ft-lbs/in$^2$.

EXAMPLE 3

Asbestos fiber (very fine) is blended with the dry plaster of Paris by mixing in a planetary mixer for 15 to 20 minutes. The dry mix includes 90 parts by weight of plaster of Paris and 10 parts by weight of asbestos fibers. The mix is then hand blended with 55 parts by weight of water per 100 parts by weight of mix. The density of the set plaster is 21.5 g/in$^3$ and the impact strength is 0.35 ft-lbs/in$^2$.

EXAMPLE 4

Example 3 is followed except that cotton fibers, size 60, are substituted for the asbestos fibers and water is used in an amount of 60 parts per 100 parts of mix. The density of the set plaster is 19.8 g/in$^3$ and the impact strength is 0.65 ft-lbs/in$^2$.

EXAMPLE 5

Example 4 is followed except that nylon fibers, 2 1/2 inches in length are substituted for the cotton fibers. Density of the set plaster is 18.4 g/in$^3$ and impact strength is 1.34 ft-lbs/in$^2$.

EXAMPLE 6

Example 5 is followed with nylon fiber flock (Nylon 66) 3 denier, 1/8 inch length. Strength of the set cast is 1.04 ft-lbs/in$^2$.

EXAMPLE 7

Example 5 is followed except that the amount of water is decreased to 30 parts and 0.1 part by weight of wetting agent (Triton X-100) is added per 30 parts of water. The strength of the set plaster is 1.14 ft-lbs/in$^2$.

The foregoing examples show that the use of a synthetic resin fiber flock increases strength of the set plaster cast well beyond the strength achieved with other materials such as asbestos and cotton. The following examples show that the synthetic resin fiber flock can be utilized in different sizes and with different mixing techniques.

EXAMPLES 8–12

Using the same mixing technique as in Examples 3–7, the strength and density of plaster using polyethylene terephthalate, (PET) and nylon fiber flock of various sizes is investigated. In each example, the composition includes 90 parts by weight plaster of paris, 10 parts by weight of synthetic resin fiber flock, and 55 parts by weight of water. The results are given in the table following:

| Example No. | Type | Fiber Denier | Length (in.) | Strength ft-lbs/in$^2$ | Density g/in$^3$ |
|---|---|---|---|---|---|
| 8  | PET   | 1.5 | ¼    | 3.90 | 18.0 |
| 9  | Nylon | 6   | ⅛    | 3.00 | 19.5 |
| 10 | PET   | 6   | ⅛    | 2.50 | 18.7 |
| 11 | PET   | 3   | 0.06 | 2.30 | 17.3 |
| 12 | PET   | 3   | 0.03 | 2.40 | 18.2 |

In examples 13–16, various mixing techniques are employed.

EXAMPLE 13

Plaster of Paris (Hydrocal) is blended in an amount of 90 parts by weight with 10 parts by weight of b 1.5 denier, 1/4 inch polyester (polyethylene terephthalate) fiber flock and 55 parts by weight of water in a ribbon mixer for 15 minutes. The set plaster has an impact strength of 2.7 ft-lbs/in$^2$.

EXAMPLE 14

Example 13 is followed except that mixing is performed in a planetary mixer for 15 minutes. The impact strength of the set plaster is 3.90 ft-lbs/in$^2$.

EXAMPLE 15

Example 13 is followed except that the fiber is 6 denier, 1/8 inch nylon fiber flock. Impact strength of the set plaster is 1.35 ft-lbs/in$^2$.

The following examples illustrate the use of various lightweight fillers in plaster including synthetic resin fiber flock according to the invention.

EXAMPLES 16–20

In these examples, expanded volcanic siliceous rock (Ryolex No. 39) is added to a plaster mix including 1.5 denier, 1/4 inch polyethylene terephthalate fiber flock in the amount indicated in the following table, the amounts being in parts by weight:

| Example No. | Ryolex | Fiber flock | Plaster of paris | Water | Impact strength (ft-lbs/in$^2$) | Density (g/in$^3$) |
|---|---|---|---|---|---|---|
| 16 | 30 | 10 | 60  | 170 | 0.36 | 6.69  |
| 17 | 20 | 10 | 70  | 120 | 1.00 | 9.88  |
| 18 | 10 | 10 | 80  | 90  | 1.42 | 11.52 |
| 19 | 0  | 10 | 90  | 55  | 4.59 | 19.67 |
| 20 | 0  | 0  | 100 | 45  | 0.89 | 25.98 |

EXAMPLES 21–24

In these examples, glass spheres (minus 325 mesh) are substituted for the expanded siliceous volcanic rock of examples 16–20 in the amounts given (in parts by weight) in the table, the composition being otherwise as in examples 17–21:

| Example No. | Glass spheres | Fiber flock | Plaster of paris | Water | Impact strength (ft-lbs/in$^2$) | Density (g/in$^3$) |
|---|---|---|---|---|---|---|
| 21 | 10 | 10 | 80 | 40 | 3.50 | 19.30 |
| 22 | 0  | 5  | 95 | 40 | 2.24 | 23.02 |
| 23 | 20 | 10 | 70 | 40 | 2.55 | 18.70 |

In all of the foregoing examples wherein synthetic resin fiber flock is utilized according to the invention, the brittleness of the set plaster is reduced relative to a water-plaster composition. Accordingly, use of the synthetic organic resin fiber flock according to the invention increases strength and simultaneously reduces brittleness of the set plaster relative to plaster formulated without the fiber flock.

I claim:

1. A plaster composition having improved set strength comprising plaster of Paris and polyester fiber flock having a length of up to about ¼ inch in an amount of 3 to 50 percent by weight based on the weight of said plaster of Paris.

2. A plaster composition according to claim 1 wherein said polyester comprises polyethylene terephthalate.

3. In a method of setting plaster wherein water is admixed with plaster of Paris to hydrate the plaster of Paris and the hydrated material is permitted to set, the improvement wherein synthetic polyester fiber flock having a length of up to about ¼ inch is mixed with the plaster of Paris prior to setting of the hydrated material to increase the strength and decrease the brittleness of the set plaster.

4. A method according to claim 3 wherein the fiber flock is mixed with the plaster of Paris prior to incorporating water therein.

5. A method according to claim 3 wherein the fiber flock is mixed with the plaster of Paris after incorporating water therein.

6. A method according to claim 3 wherein said fiber flock is added in an amount of 3 to 50 percent by weight based on the weight of said plaster of Paris.

7. A method according to claim 3 wherein said polyester comprises polyethylene terephthalate.

* * * * *